(12) United States Patent
Tatsuta et al.

(10) Patent No.: US 7,830,771 B2
(45) Date of Patent: Nov. 9, 2010

(54) OPTICAL INFORMATION RECORDING MEDIUM UTILIZING HOLOGRAPHY AND ELECTRONIC EQUIPMENT USING THE MEDIUM

(75) Inventors: Shinichi Tatsuta, Tokyo (JP); Yuji Kubota, Yokohama (JP); Kazuki Matsumoto, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 835 days.

(21) Appl. No.: 11/686,672

(22) Filed: Mar. 15, 2007

(65) Prior Publication Data

US 2007/0230317 A1 Oct. 4, 2007

(30) Foreign Application Priority Data

Mar. 30, 2006 (JP) .............................. 2006-094796

(51) Int. Cl.
*G11B 7/00* (2006.01)

(52) U.S. Cl. ....................................... 369/103; 369/283

(58) Field of Classification Search ....................... None
See application file for complete search history.

(56) References Cited

U.S. PATENT DOCUMENTS

| | | | | |
|---|---|---|---|---|
| 5,844,700 A | * | 12/1998 | Jeganathan et al. | ............ 359/7 |
| 6,322,933 B1 | * | 11/2001 | Daiber et al. | .................. 430/2 |
| 6,563,779 B1 | * | 5/2003 | McDonald et al. | .......... 369/103 |
| 6,594,220 B1 | * | 7/2003 | Matsushita et al. | .......... 369/103 |
| 6,670,079 B1 | * | 12/2003 | Kitamura et al. | ............... 430/1 |
| 6,888,785 B2 | * | 5/2005 | Morrison | ..................... 369/103 |

FOREIGN PATENT DOCUMENTS

| | | |
|---|---|---|
| JP | 05-204287 | 8/1993 |
| JP | 11-052827 | 2/1999 |
| JP | 11-212501 | 8/1999 |
| JP | 2000-105925 | 4/2000 |
| JP | 2000-155950 | 6/2000 |
| JP | 2001-027882 | 1/2001 |
| JP | 2004-054184 | 2/2004 |
| JP | 2004-265472 | 9/2004 |
| JP | 2004-294273 | 10/2004 |

OTHER PUBLICATIONS

Coufal et al, Holographic Data Storage, Part I, Chapter I, Section I, Overview of Holographic Multiplexing Methods, 2000.
Japanese Office Action for 2006-094796 mailed on Jun. 8, 2010.

* cited by examiner

*Primary Examiner*—Paul Huber
(74) *Attorney, Agent, or Firm*—Turocy & Watson, LLP (57) ABSTRACT

An optical information recording medium in which a inner layer is sandwiched between supporting plates and a number of recording portions formed of a recording material capable of recording information in the form of a hologram are rotatably arranged in the inner layer. The recording portion is rotated by electrifying its surface and an information beam and a reference beam are directed onto it from different angles to carry out angle multiplex recording. The surface of the recording portion is color coded with at least two colors. The color coding and rotation of the recording portions allow characters or images to be displayed. Electronic equipment using such an optical information recording medium is provided.

10 Claims, 6 Drawing Sheets

OPTICAL INFORMATION RECORDING MEDIUM UTILIZING HOLOGRAPHY AND ELECTRONIC EQUIPMENT USING THE MEDIUM

CROSS-REFERENCE TO RELATED APPLICATIONS

This application is based upon and claims the benefit of priority from the prior Japanese Patent Application No. 2006-094796, filed Mar. 30, 2006, the entire contents of which are incorporated herein by reference.

BACKGROUND OF THE INVENTION

1. Field of the Invention

The present invention relates to an optical information recording medium adapted to record information via holography and electronic equipment using that optical information recording medium.

2. Description of the Related Art

Conventionally, the recording density of optical information recording media, exemplified by compact discs (CDs) and digital video discs (DVDs), has been increased mainly by reducing the wavelength of laser light and increasing the numerical aperture (NA) of an objective lens. However, it is thought that these approaches are nearing limitations from technical reasons. Thus, a demand has increased for new means and systems to increase the recording density.

To meet such a demand, research and development has been conducted actively. As one system to be expected, a holographic memory has been proposed. This holographic memory is disclosed in JP-A 2004-265472 (KOKAI) by way of example. As is described in detail in reference (H. J. Coufal et al., "Holographic Data Storage", Springer, 2000), the holographic memory, which is one of the so-called volume recording systems, records information on a recording medium in the directions of plane and the directions of height utilizing holography. In short, the holographic memory is adapted to direct an information beam produced by spatially modulating laser light with information and a laser beam (reference beam) of the same wavelength as the information beam onto the same portion of a recording medium and record an interference pattern between the information and reference beams in the recording medium. Upon reproduction, only a reference beam is directed onto the recording medium, whereby the information beam at the record time is reproduced and the information is recovered.

The DVD is a so-called plane recording system in which recording marks representing information are formed on the recording surface, while the holographic memory is a volume recording system. For this reason, the holographic memory is expected to achieve higher recording density than the DVD. One way to increase the recording density of the holographic memory is multiplex recording. This involves recording two or more interface patterns in the same location of a recording medium. The multiplex recording techniques include angle multiplexing in which the irradiation angle of laser light is changed and shift multiplexing in which the irradiation position of laser light is changed.

Conventionally, to implement such multiplex recording, movement is needed which involves rotation for angle change. Therefore, a complex mechanism is mounted which is adapted to move and rotate the entire recording medium or the optical section including an objective lens.

In addition, in order to allow users to confirm information recorded on a recording medium, such as a CD or DVD, without reproduction, a system has been proposed which prints or displays characters or patterns of visible size on the label side of the recording medium. For instance, there are a printer adapted to permit direct printing on a side of a recording medium such as a CD or DVD and the Light Scribe system™ proposed by Hewllet-Packerd Development Company which is adapted to make printing using laser light as a function of a CD/DVD recording and playback apparatus.

The use of such apparatus allows the contents of information recorded on a recording medium to be printed on the medium itself and users to recognize a summary of the recorded contents at a glance. Therefore, it is easily expected that such means will also be required of future holographic memories.

On the other hand, there are cases where holograms, such as rainbow holograms or Lippmann holograms, which can be verified with the naked eye are affixed on bills or credit cards in order to increase security.

BRIEF SUMMARY OF THE INVENTION

According to an aspect of the embodiments, there is provided an optical information recording medium comprising: recording portions each formed in the shape of a sphere or cylinder using a recording material capable of recording information in the form of a hologram using light.

According to another aspect of the embodiments, there is provided electronic equipment comprising: an optical information recording medium including recording portions each formed in the shape of a sphere or cylinder using a recording material be recorded an information in the form of a hologram using light and having being charged, a inner layer in which the recording portions are rotatably arranged, and a pair of supporting plates which sandwich the inner layer and are formed with electrodes to produce an electric field within the inner layer, at least one of the plates having a optical transmittivity to the light; a light source which emits the light; an optical section which conducts the light emitted from the light source to the recording portions; a spatial light modulator which is set in the optical section and modulates the light with information to produce information light; a voltage driver which applies a voltage to the electrodes to produce an electric field within the inner layer to thereby rotate the recording portions; an image capture device which captures reproduced light resulting from the recording portions being irradiated with the light; and an image processor which takes the information from reproduced light captured by the image capture device.

DETAILED DESCRIPTION OF THE INVENTION

The embodiments of the present invention will be described hereinafter with reference to the accompanying drawings.

Figure 1:
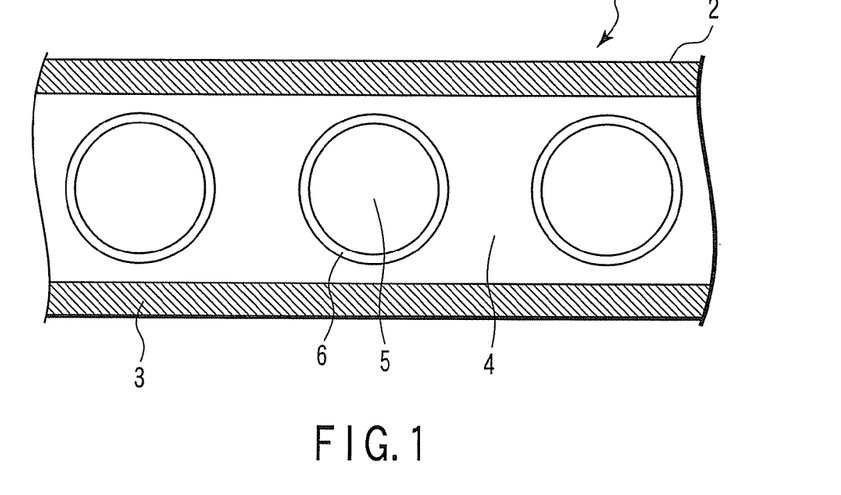
FIG. 1 is a schematic sectional view of an optical information recording medium according to a first embodiment.
Figure 2:
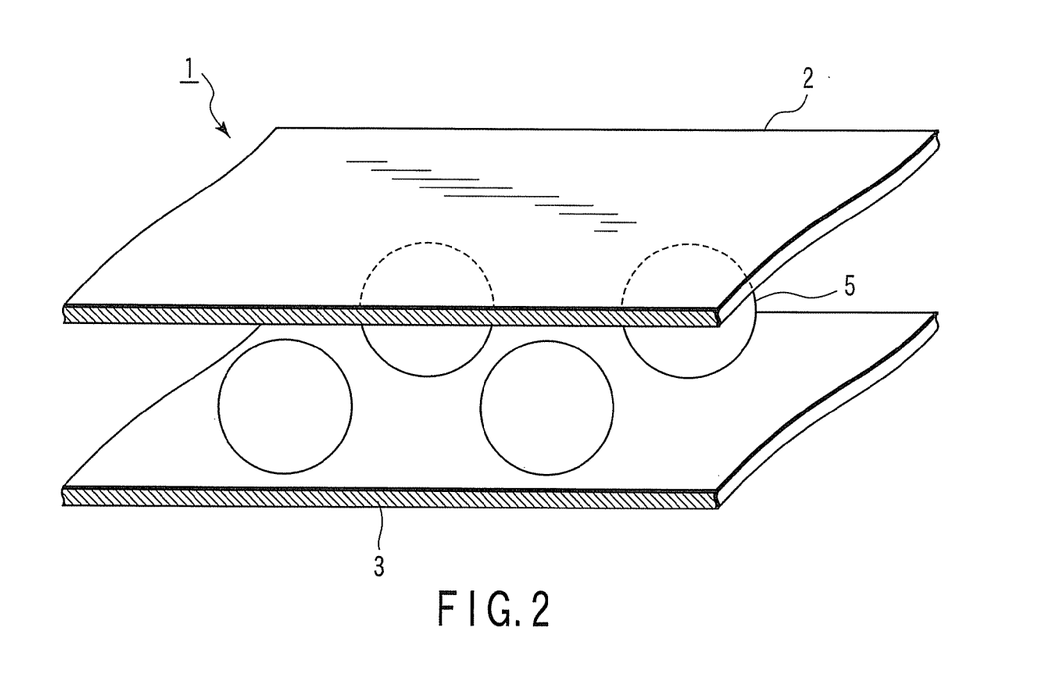
FIG. 2 is a schematic perspective view illustrating the internal arrangement of the optical information recording medium of the first embodiment.

The embodiments will be described as using laser light as light for recording or reproducing a hologram. FIG. 1 is a schematic sectional view of an optical information recording medium according to a first embodiment. FIG. 2 shows schematically shows the internal arrangement of the optical information recording medium.

The optical information recording medium, indicated generally at 1, has a inner layer 4 inserted between a pair of supporting plates 2 and 3 opposed to each other. A number of recording portions 5, each consisting of a recording material adapted to recording information in the form of a hologram, is rotatably arranged in the inner layer 4.

The recording material forming the recording portions 5 may be either solid or liquid. A material that can maintain its shape and does not flow inside is suitable. When the recording portion 5 is liquid, it may be included with an outer wall 6 made of one kind of material so that it may not leak out to the medium 4. If the recording portion 5 cannot mix with the medium 4, it may also be directly placed within the medium. The recording portion 5 is generally made of a radical polymer called a photopolymer and often contains radical polymer compounds, an optical radical polymerization initiator, matrix materials, etc. Any other material may be used provided that it enables recording of holograms.

Although the recording portion 5 in this embodiment is formed in the shape of a sphere as shown in FIG. 2, this is not restrictive. If the recording portion is spherical, it is desirable that its diameter or external dimension be on the order of 100 µm to 1 mm. Depending on applications, the recording portion may have different dimensions.

The outer wall 6 including the recording portion 5 can be made of a material, such as glass, synthetic resin, etc., that the optical transmittivity (allows light to pass through) and can maintain its shape. It is desirable that its thickness be very small as compared with the size of the recording portion 5.

For the inner layer 4, a transparent silicon resin is suitable. It is desirable that its refractive index at the wavelength of laser light used for recording and reproduction be comparable to that of the recording portion 5. If so, the refraction and reflection of light passing through the interface between the inner layer 4 and the recording portion 5 can be suppressed to a minimum. Therefore, the effects of refraction, reflection and aberration of light due to the shape of the recording portion 5 can be reduced to enhance the recording/reproduction quality and simplify the optical system because of optical parts required for correction becoming unnecessary.

In order to allow the recording portion 5 to rotate smoothly, a very small gap is provided at the interface between the recording portion 5 or the outside wall 5 and the inner layer 4. A lubricant, such as a gas or oil, may be injected into the gap. However, the lubricant is not necessarily required. In particular, it is not required when the lubricity between the recording portion 5 or the outside wall 5 and the inner layer 4 is sufficiently high.

That is, the optical information recording medium 1 of this embodiment can be used without making any special change to the recording/reproduction device or the optical system used in conventional holographic memories. To prevent parallel movement of the recording portions 5 due to gravity, it is desirable that the inner layer 4 used be small in fluidity like a solid such as resin. This is not restrictive, however, when the recording portion 5 and the inner layer 4 are nearly equal to each other in specific gravity and little parallel movement of the recording portions due to gravity occurs.

The paired supporting plates 2 and 3 between which the inner layer 4 is sandwiched are each made of a material, such as glass, polycarbonate, acrylic, etc., which the optical transmittivity. Depending upon constructions, however, it is not necessarily required that both the supporting plates have light transmission property. That is, the optical information recording medium may be configured to use a transparent plate for one of the paired supporting plates and an opaque plate having a reflective surface inside for the other. Recording or reproduction of information is performed through the transparent plate.

According to the first embodiment described above, the optical information recording medium is simple in construction and recording portions with sensitivity to different wavelengths are mingled on the same recording medium. Thus, recording and reproduction of information can be performed on one information recording medium using a number of wavelengths. In addition, the information recording medium is allowed to undergo the same optical treatment as conventional holographic recording media.

Figure 3:
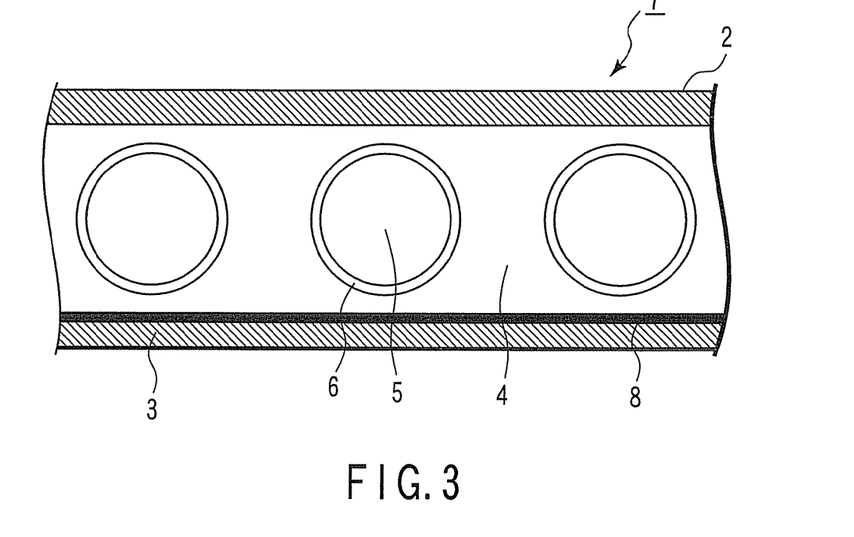
FIG. 3 is a schematic sectional view of an optical information recording medium according to a second embodiment.

FIG. 3 shows a schematic sectional view of an optical information recording medium 7 according to a second embodiment. In the optical information recording medium 7 shown in FIG. 3, corresponding parts to those in the information recording medium 1 of the first embodiment described above are denoted by like reference numbers and descriptions thereof are omitted.

The optical information recording medium 7 of this embodiment uses a transparent member for the supporting plate 2 and has the other supporting plate 3 formed with a reflecting layer 8 serving as a reflective surface. The reflective layer 8 is formed so that the inner surface of the supporting plate 3 serves as a reflective surface. Thus, recording or reproduction of information is carried out through the transparent supporting plate. In the case of this configuration, the supporting plate 3 formed with the reflective surface is simply made of any material which has a structurally required strength. For example, it may be made of a metallic material.

Figure 4:
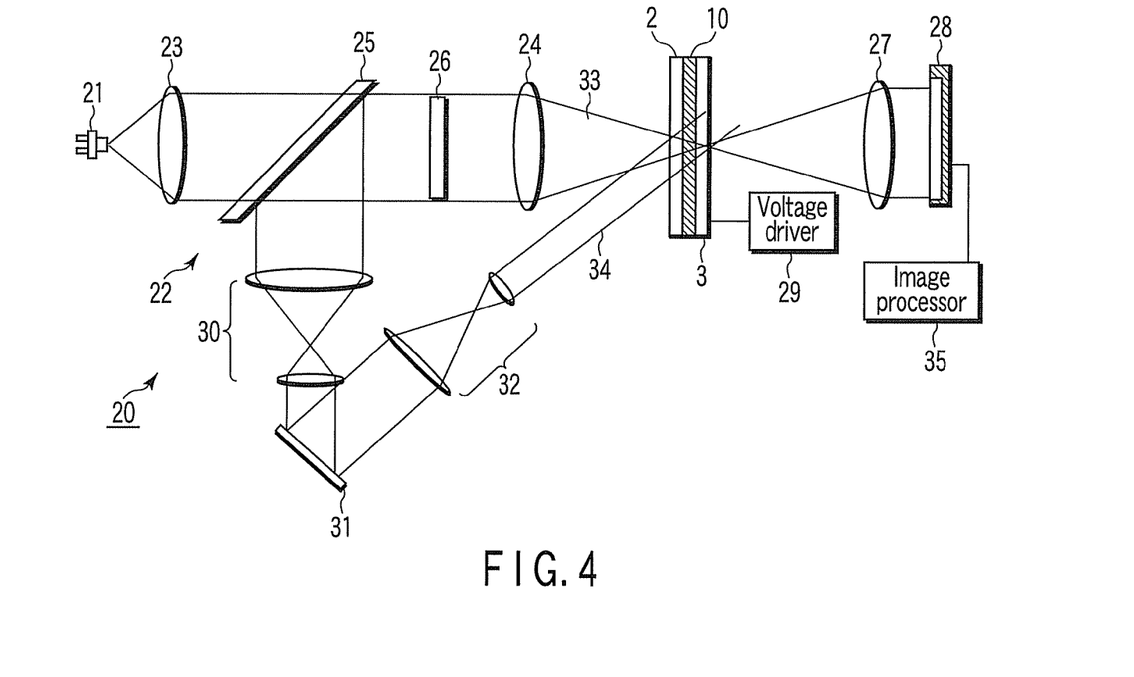
FIG. 4 is a schematic diagram of electronic equipment adapted to record or reproduce information on or from the optical information recording medium of the first embodiment.

FIG. 4 schematically shows a configuration of electronic equipment that performs recording or reproduction of information on the optical information recording medium 1 of the first embodiment.

The electronic equipment 20 adopts what is referred to as a two-beam interference system in which an information beam and a reference beam pass through different objective lenses. That is, the equipment is configured to optically record or reproduce information in the form of a hologram on or from the optical information recording medium 1 of the first embodiment.

As shown in FIG. 4, the electronic equipment is constructed from a laser light source 21 that emits a beam of light, a collimator lens 23 and an objective lens 24 that form an optical section 22, a beam splitter 25 which separates the light beam into two components (one is transmitted and the other is reflected), a spatial light modulator 26 which is incorporated for optical data processing (production of an information beam or a reference beam), an image capture device 28 which captures a light beam bearing image information from the optical information recording medium 1 through a taking lens 27, a voltage driver 29 adapted to apply a voltage between electrodes 9a and 9b (shown in FIG. 6) of the mounted optical information recording medium 1, an image processor 35 which processes a captured image to extract information, an angle adjust mirror 31 adapted to reflect a reference beam 34 at a desired angle, a relay lens 30 adapted to direct a beam (reference beam 34) separated by the beam splitter 25 to the angle adjust mirror 31, and an objective lens 32 which directs the reference beam 34 reflected by the mirror 31 onto the optical information recording medium 1. The optical information recording medium 1 has the same configuration as with the first embodiment and comprises a holographic recording layer 10 including the recording portions 5 and the inner layer 4, and the supporting plates 2 and 3.

In the electronic equipment thus configured, upon information recording, part of a laser beam emitted from the laser light source 21 is directed through the collimator lens 23 and the beam splitter 25 onto the spatial light modulator 26. An information beam 33 which has information added by the spatial light modulator 26 is converged by the objective lens 24. On the other hand, a reference beam, which is of the same wavelength as the information beam, reflected by the angle adjust mirror 31 is converged by the objective lens 32. The information beam 33 and the reference beam thus converged are directed onto the holographic recording layer 10 of the optical information recording medium 1 at the same time, whereby information is recorded on the recording portion 5. To perform angle multiplex recording on the optical information recording medium 1, as will be described later in a third embodiment, the recording portion 5 is simply irradiated again with information and reference beams after they have been rotated through an arbitrary angle. The electronic equipment is equipped with a moving mechanism which allows a desired recording portion to be recorded on or reproduced from to be selected from a number of recording portions 5 within the mounted optical information recording medium 1. The moving mechanism is adapted to move in small increments along the plane perpendicular to the optical axis of laser light. This moving mechanism may be set either in the optical system or on a holder on which the optical information recording medium 1 is mounted. In this case, it is not necessary to provide a mechanism adapted to change the incident angle of laser light to the recording portions 5.

In reproducing information from the optical information recording medium 1, a laser beam emitted from the laser light source 21 is directed through the collimator lens 23 onto the beam splitter 25 where it is split into two beams and one of the two beams is reflected. The reflected beam passes through the relay lens 30 and is then reflected by the angle adjust mirror 31 set at an arbitrary angle so as to fall on the information bearing recording portion 5 as the reference beam 34. The reflected reference beam 34 is converged by the objective lens 32 and then directed onto the recording portions 5 in the optical information recording medium 1. Light reproduced as the result of irradiation of the recording medium with the reference beam 34 is captured by the image capture device 28. The image processor 35 takes information from image data captured by the image capture device 28. Each component of the electronic equipment is controlled by a controller not shown.

The electronic equipment 20 has its optical system fixed. Unlike conventional devices, therefore, it is not necessary to drive the optical system to change the incidence angle of the information beam and not necessary to move the optical system. Likewise, no moving mechanism is necessary to change the incidence angle to the optical information recording medium. As to the reference beam, the angle adjust mirror is provided to change the incidence angle to the recording medium.

Figure 5:
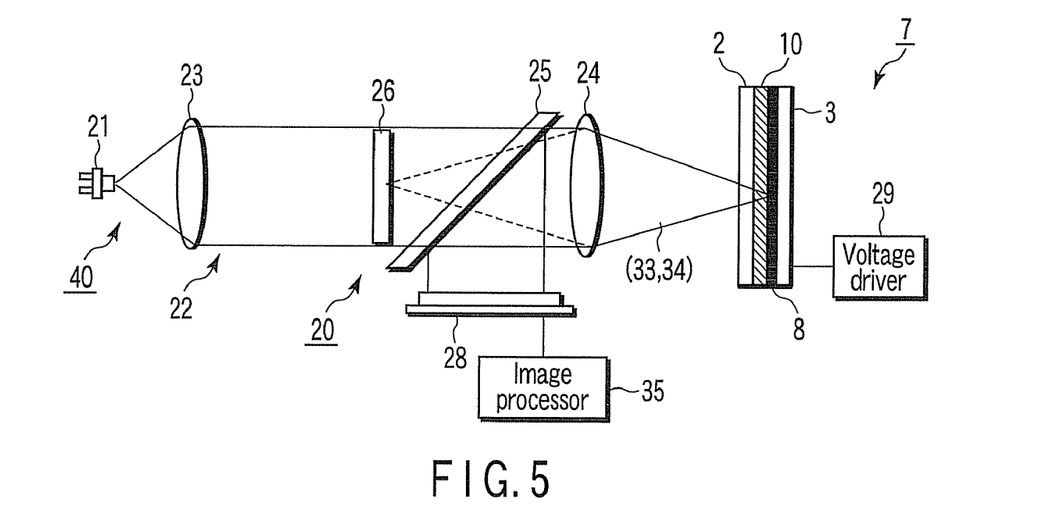
FIG. 5 is a schematic diagram of electronic equipment adapted to record or reproduce information on or from the optical information recording medium of the second embodiment.

FIG. 5 schematically shows a configuration of electronic equipment that performs recording or reproduction of information on or from the optical information recording medium 1 of the second embodiment shown in FIG. 3.

This electronic equipment 40 is adapted to optically record or reproduce information in the form of a hologram on or from the optical information recording medium 7 having the reflective layer 8 in accordance with the second embodiment. The electronic equipment adopts what is referred to as a coaxial colinear system in which an information beam and a reference beam pass through the same objective lens. In the electronic equipment 40 shown in FIG. 5, parts equivalent to those in the electronic equipment 20 described above are denoted by like reference numbers.

As shown in FIG. 5, the electronic equipment is composed of a laser light source 21 that emits laser light, a collimator lens 23 and an objective lens 24 that form an optical system, a spatial light modulator 26 which is incorporated for optical data processing (production of an information beam or a reference beam), a beam splitter 25 which separates a light beam into two components (one is transmitted and the other is reflected), an image capture device 28 which captures image information contained in a light beam from the optical information recording medium 7, a voltage driver 29 adapted to apply a voltage between electrodes of the mounted optical information recording medium 7, and an image processor 35 which processes a captured image to extract information. The optical information recording medium 7 has the same configuration as with the second embodiment and is comprised of a holographic recording layer 10 including the recording portions 5 and the inner layer 4, the reflective layer 8, and the supporting plates 2 and 3.

With the electronic equipment 40 thus configured, upon information recording, a beam of light emitted from the laser light source 21 is directed through the collimator lens 23 onto the spatial modulator 26. An information beam 33 which has information added by the spatial modulator 26 is converged by the objective lens 24 onto the holographic recording layer 10 of the optical information recording medium 1, whereby the information is recorded on the recording portion 5. Upon reproduction, on the other hand, a beam of light emitted from the laser 21 is directed through the optical system 22 onto the recording portion 5 recorded with information as a reference beam 34. The reference beam 34 passes through the recording portion 5, whereupon the information is reproduced. The reference beam is then reflected by the reflective layer 8 and directed through the objective lens 24 onto the beam splitter 25. The beam splitter reflects the information bearing beam onto the image capture device 28. The information is taken from captured image data by the image capture device 28 by the image processor 35. Each component of the electronic equipment is controlled by a controller not shown. The electronic equipment 40 has its optical system fixed. Therefore, it is not necessary to drive the optical system to change the incidence angle of the information beam or move the optical system. Likewise, no moving mechanism is necessary to change the incidence angle to the optical information recording medium.

Next, a third embodiment will be described below.

Figure 6:
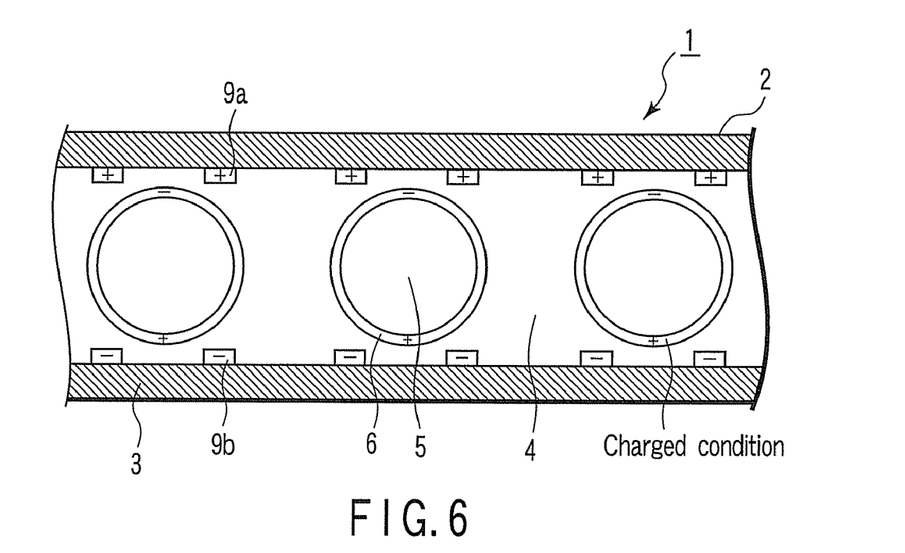
FIG. 6 is a schematic sectional view of an optical information recording medium according to a third embodiment.

FIG. 6 shows a schematic sectional view of an optical information recording medium according to the third embodiment. The optical information recording medium of this embodiment is configured such that electrodes are added to the optical information recording medium of the first embodiment. In the optical information recording medium shown in FIG. 6, corresponding parts to those in the information recording medium of the first embodiment described above are denoted by like reference numbers and detailed descriptions thereof are omitted.

The optical information recording medium 1 has transparent electrodes 9a and 9b arranged on at least one of the supporting plates 2 and 3 between which the inner layer 4 is sandwiched so that at least two regions of each recording portion 5 or outer wall 6 become positively or negatively charged. This is intended to allow the angle of rotation of each recording portion to be controlled. The + and − signs and the charged conditions of the outer walls and electrodes shown in FIG. 6 are by way of illustration and not by way of limitation. When only one of the supporting plates 2 and 3 have the transparent electrodes, the other has a reflective surface formed on it as with the second embodiment.

In the optical information recording medium 1, the supporting plates 2 and 3 are formed on inside surface with frame-shaped transparent electrodes 9a and 9b so that they are opposed to each other to surround the proximate portions of a corresponding one of the spherical recording portions 5. A voltage is applied between the electrodes 9a and 9b by a voltage driver 29 shown in FIG. 4. A ring or rectangle may be considered as the shape of the electrodes 9a and 9b. Of course, the electrodes are each allowed not only to be one-piece construction but also to be split construction. It is necessary only that the electrodes be formed to cover all sides at least in the plane direction. In particular, splitting of the electrodes into pieces allows the angle of rotation of the recording portion to be adjusted in small increments. In such a case, the charged conditions of the recording portion 5 (charge distributions and distribution areas) are simply varied by adjusting the times at which voltages are applied to the electrode pieces, or the values of voltage to be applied to the electrode pieces.

When a voltage is applied between the electrodes 9a and 9b to produce an electric field, the recording portion 5 rotates in accordance with its charged conditions. At this time, it is necessary to prevent parallel movement of the recording portion 5 in the direction of the plane of the supporting plates. In order to prevent parallel movement of the recording portion resulting from rotation or due to gravity, it is desired that the inner layer 4 be small in fluidity like a solid such as a resin. However, such a requirement need not necessarily be met if the amount of parallel movement of the recording medium 5 due to rotation is small and moreover the amount of parallel movement due to gravity is small because the recording portion 5 and the inner layer 4 are nearly equal to each other in specific gravity.

Upon recording information on the recording portion 5, initialization is carried out as required. In this initialization process, a voltage is first applied between the electrodes 9a and 9b to produce an electric field for initialization so that the recording portion 5 is set in a predetermined initial position.

Then, an information beam and a reference beam are directed onto the recording medium 5 from a predetermined first angle. In the above-described electronic equipment, the optical system adapted to irradiate the recording medium 5 with an information beam and a reference beam is configured such that the angle of irradiation to the recording portion is fixed. For multiplex recording, therefore, it is only necessary to direct an information beam and a reference beam onto the recording portion 5 after it has been further rotated through a given angle (second angle) by applying a voltage between the electrodes to produce an electric field for rotation again. For such angle-based multiplex recording, the recording portion 5 may be rotated in uniform angular steps or in nonuniform angular steps (the first and second angles are not equal to each other).

To reproduce multiplex recorded information, on the other hand, initialization is first carried out on the recording portion 5 to reset it to the initial position of a position. The recording portion 5 is then rotated from the initial position until the position on it where information is recorded reaches the information read position. If the current position on the recording portion 5 in which information is recorded is known, it may be directly rotated to the information read position without returning to the initial position. After that, a reference beam is directed onto the information recorded position on the recording portion 5 and then the transmitted or reflected beam is received to reproduce information in the form of a hologram.

As described above, the optical information recording medium of the present embodiment can perform angle-based multiplex recording to achieve a great increase in recording density. Even when recording portions other than an object recording portion are rotated at the same time upon reading information, it does not disturb reproduction of a hologram.

According to the present embodiment, holographic multiplex recording can be implemented with no need to rotate the optical information recording medium or the optical system of recording and reproducing electronic equipment, thus allowing the recording and reproduction apparatus to be simplified or downsized and the recording capacity to be increased.

In addition, the present embodiment is configured such that the supporting plates 2 and 3 of the optical information recording medium are provided with transparent electrodes and a voltage driver for producing an electric field is electrically connected to the electrodes. However, the supporting plates need not always be equipped with electrodes. For example, an electric field producing unit may be prepared which has a space and is adapted to produce an electric field inside the space. The use of such a unit allows recording portion 5 to be rotated by inserting the optical information recording medium into that space and producing an electric field for rotation. Such a configuration can control the rotation of the recording portion 5 from outside, thus allowing the need for the transparent electrodes to be eliminated and the construction to be simplified.

Figure 7A:
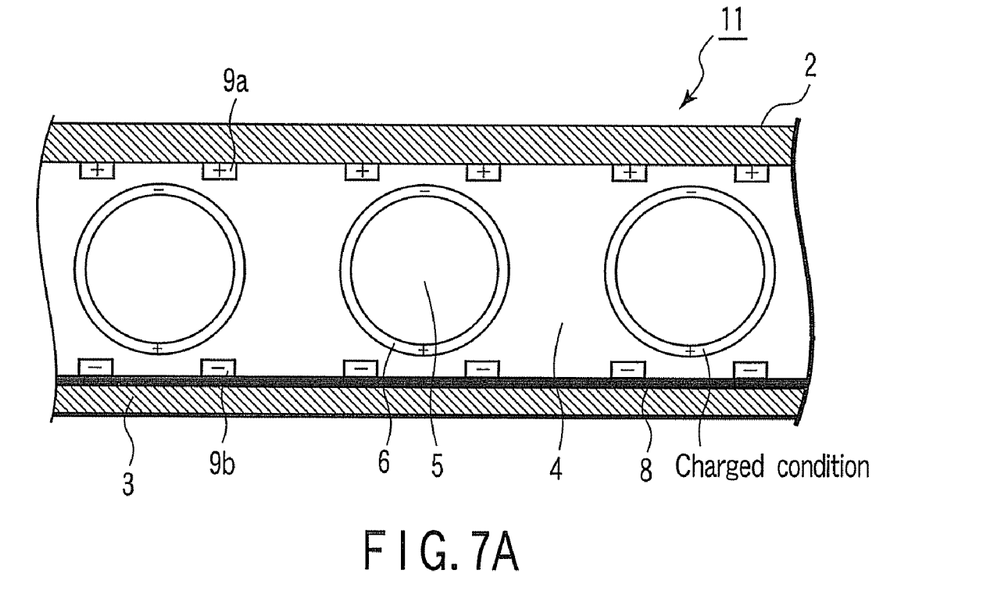
FIG. 7A is a schematic sectional views of optical information recording media according to a fourth embodiment.
Figure 7B:
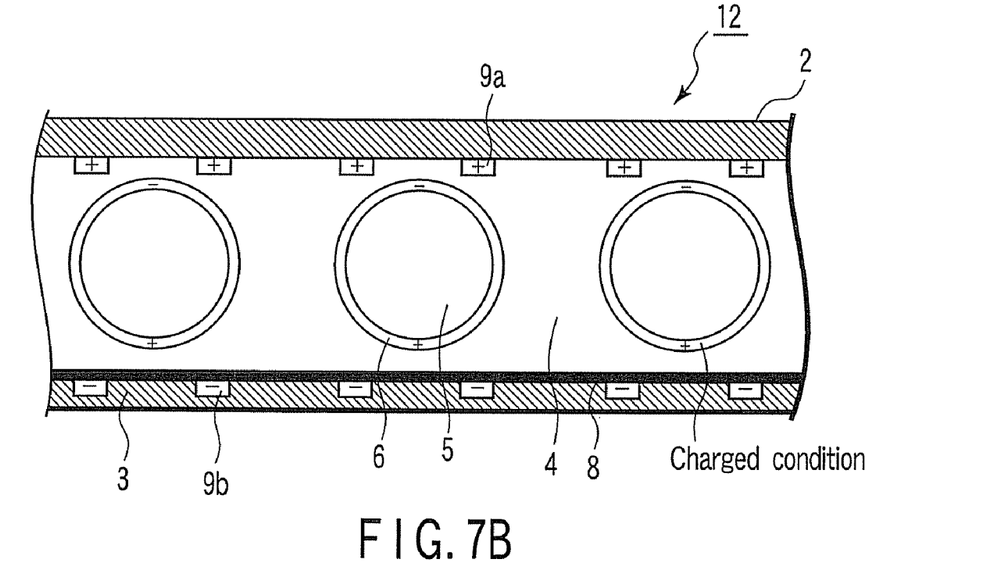
FIG. 7B is a schematic sectional views of an optical information recording media according to a fourth embodiment.

FIGS. 7A and 7B are schematic sectional views of an optical information recording medium according to a fifth embodiment. The optical information recording medium of this embodiment is configured such that electrodes are added to the optical information recording medium with a reflective layer in the second embodiment. In this embodiment, corresponding parts to those in the second embodiment are denoted by like reference numbers and detailed descriptions thereof are omitted.

The optical information recording medium 11 shown in FIG. 7A has its one supporting plate 2 made of a transparent material and its other supporting plate 3 formed on inside surface with a reflective layer 8 serving as a reflective surface. Transparent electrodes 9a and 9b are arranged on the medium sides of the supporting plates 2 and 3, respectively. The electrodes 9a and 9b are connected to a voltage driver not shown.

In this optical information recording medium 11, the electrodes 9a and 9b formed on the inside surfaces of the supporting plates 2 and 3 are formed in the shape of a frame (ring or rectangle) as in the third embodiment. It is only required that the electrodes 9a and 9b be formed to cover all sides at least in the plane direction. The angle of rotation of the recording portion may be adjusted in small increments by splitting the electrodes into pieces.

The recording portion 5 can be rotated in a controlled manner by positively or negatively charging the recording portion 5 or the outer wall 6 to produce an electric field for rotation as in the third embodiment. The + and − signs and the charged conditions of the outer walls and electrodes shown in FIG. 7A are by way of illustration, not limitation. The charged conditions of the recording portion 5 (charge distributions and distribution areas) can be varied by adjusting the times at which voltages are applied to the electrodes 9a and 9b, or the values of voltage to be applied to the electrodes.

In the optical information recording medium 12 shown in FIG. 7B, which has substantially the same configuration as the optical information recording medium 11 shown in FIG. 7A, the electrodes 9b are formed between the supporting plate 3 and the reflective layer 8. Although the electrodes 9a are transparent, the electrodes 9b need not be transparent. Although the electrodes 9a and the electrodes 9b need not always be formed from the same material, it is desired that they be equally charges in an electric field formed.

The fourth embodiment will offer the same advantages as the third embodiment.

Next, a fifth embodiment will be described.

Figure 8:
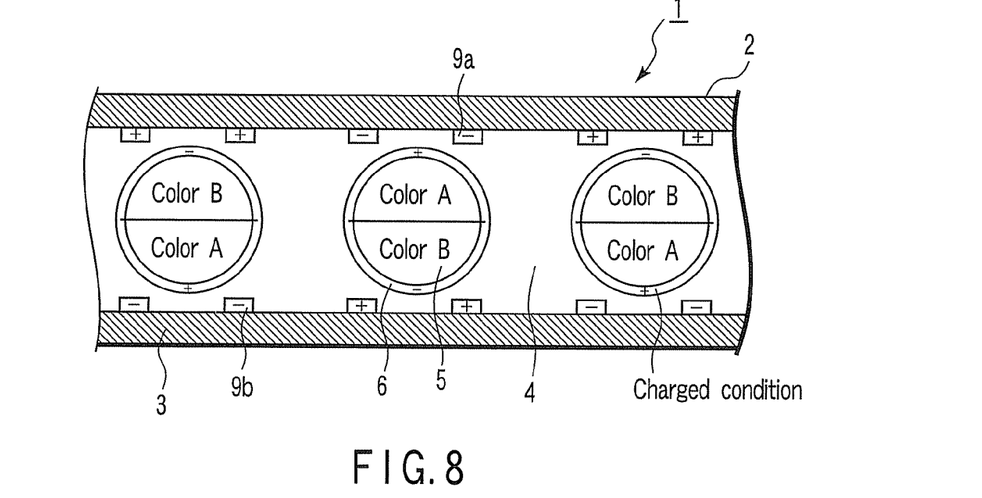
FIG. 8 is a schematic sectional view of an optical information recording medium according to a fifth embodiment.

FIG. 8 is a schematic sectional view of an optical information recording medium according to the fifth embodiment. The optical information recording medium of this embodiment is configured such that the surface of each of the recording portions 5 of the optical information recording medium 1 of the third embodiment is colored. In this embodiment, corresponding parts to those in the first and third embodiments are denoted by like reference numbers and detailed descriptions thereof are omitted.

In this optical information recording medium 1, the recording portion 5 or outer wall 6 are color-coded by coloring at least two regions with different colors A and B. The use of the color-coded portions allows the color or brightness perceived at outside viewpoint to be adjusted by rotating the recording portion 5. Hereinafter, the color or brightness is expressed as color. In FIG. 7, the + and − signs representing charged conditions, color-coded conditions, and the positions of the electrodes are only by way of illustration, not limitation.

The color coding in this embodiment may be achieved by mixing colored particles in the recording portion or by imparting different light transmission properties to different portions of the recording portion 5 or outer wall 6. However, it is necessary to ensure that the recording portion or outer wall allows a laser beam used in holographic recording and reproduction to pass through with no loss.

Here, a positional relationship between charged regions and colored regions of the recording portion 5 or outer wall 6 must be known in advance. To this end, the recording medium 5 may be prepared after the positional relationship has been controlled upon charging or coloring. Furthermore, the positional relationship may be grasped using an external camera after charging and coloring. In this case, the rotational angle of the recording medium 5 is controlled on the basis of information concerning the grasped positional relationship upon recording/reproduction or display.

When this embodiment is applied to the second embodiment, at least one of the paired supporting plates 2 and 3 is necessary to allow visible light to pass through. The embodiment is equivalent to the third embodiment in recording and reproduction of holograms.

The optical information recording medium of this embodiment is allowed to have a function as a display device such as so-called electronic paper. For example, in angle multiplex recording/reproduction by rotation of the recording portion 5, a display color at the time of recording/reproduction at a certain angle and a display color at a different angle look different when viewed with the human eye from outside. If recording/reproduction is performed at a different angle for each recording portion, a different character or image can be displayed at each recording/reproduction. Furthermore, arbitrary display can be made by changing the angle irrespective of recording or reproduction.

In addition, the outer wall 6 may be formed in part with a region that blocks light to which the recording material is sensitive. By rotating the recording portion 5 so that the region is positioned on the incidence side of external light, the region is allowed to function as a shutter to prevent exposure to light. The light blocking region does not need to allow laser light used in recording or reproduction of holograms to pass through.

According to the fifth embodiment, holographic multiplex recording can be implemented using an electric field for rotation with no need of a mechanism to rotate the optical information recording medium or the optical system of the recording and reproducing electronic equipment, thus allowing the recording and reproduction apparatus to be simplified or downsized and the recording capacity to be increased. In addition, the optical information recording medium that implements holographic multiplex recording can be added with a function as electronic paper or display device or a function as a shutter to prevent exposure to light.

Next, a sixth embodiment will be described.

Figure 9:
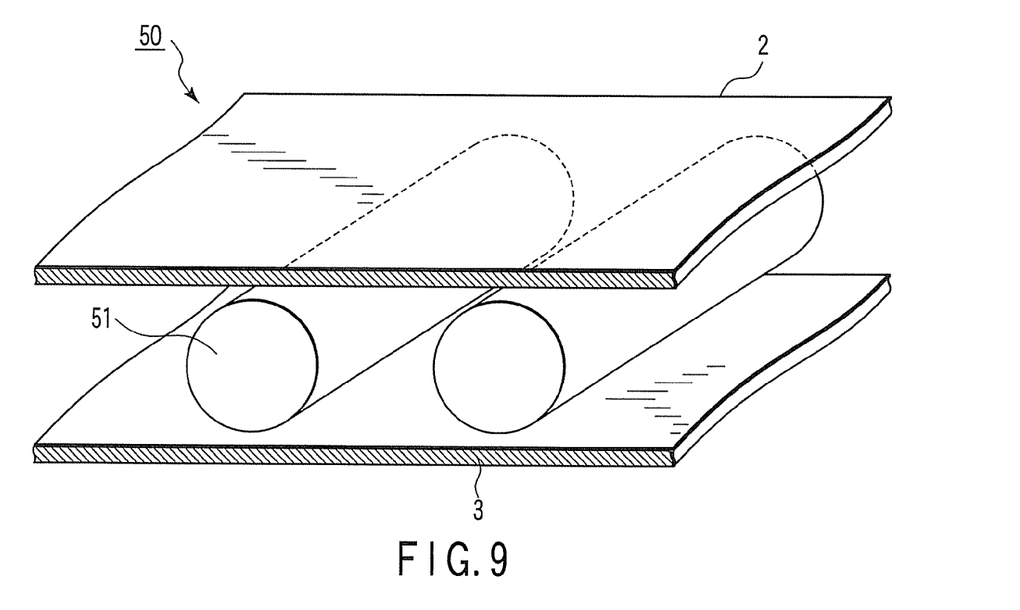
FIG. 9 is a schematic sectional view of an optical information recording medium according to a sixth embodiment.

FIG. 9 is a schematic sectional view of an optical information recording medium according to the sixth embodiment. The optical information recording medium of this embodiment is configured such that, unlike the spherical recording portions 5 of the optical information recording medium 1 in the first embodiment, cylindrical recording portions 51 are arranged side by side. In this embodiment, corresponding parts to those in the first embodiment are denoted by like reference numbers and detailed descriptions thereof are omitted.

The recording portions 51 of the optical information recording medium 50 are formed in the shape of a cylinder having substantially the same diameter as the spherical recording portions 5 in the first embodiment and are arranged side by side along the plane of the supporting plates. The recording portions 51 are also set to be rotatable within the inner layer 4, which is sandwiched between the paired supporting plates 2 and 3.

The recording portions 51 are allowed to rotate only in one direction (the direction from one of the supporting plates to the other). As in the first embodiment, the recording portions 51 and the outer wall 6 that charged conditions are rotated by an electric field produced by applying a voltage between electrodes not shown. This embodiment is also allowed to have a function as a display device based on color coding in the fifth embodiment.

The recording portion 51 of the optical information recording medium 50 of this embodiment has a larger recording capacity than the recording portion 5 of the first embodiment. In addition, the recording portion 51 can be fabricated more readily than the recording portion 5 in the first embodiment because it is allowed to be large in size.

Next, a seventh embodiment will be described.

Figure 10A:
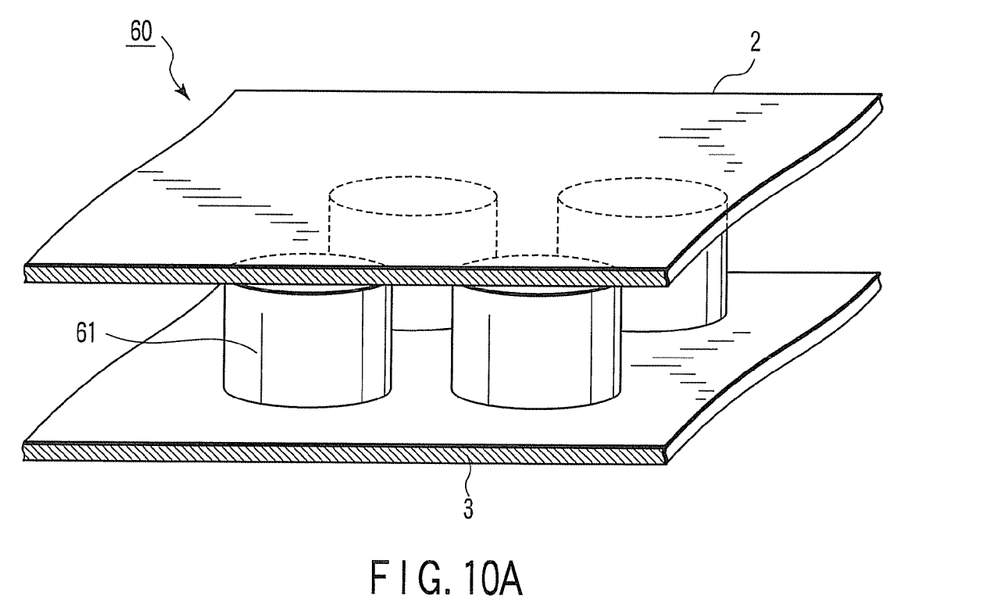
FIG. 10A is a schematic sectional views of an optical information recording media according to a seventh embodiment.
Figure 10B:
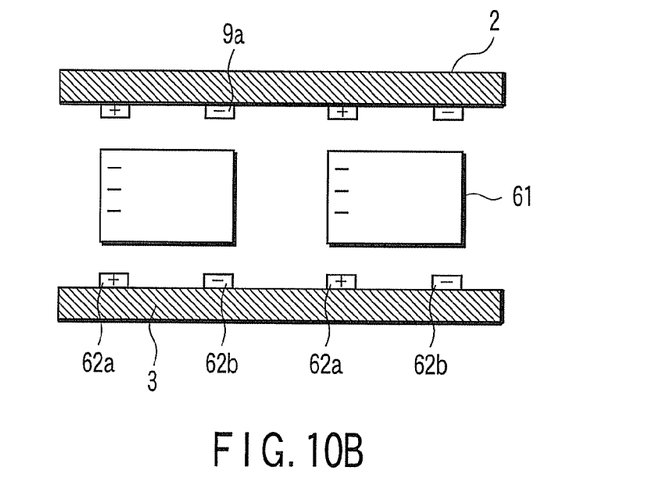
FIG. 10B is a schematic sectional views of an optical information recording media according to a seventh embodiment.

FIGS. 10A and 10B are schematic sectional views of an optical information recording medium according to the seventh embodiment. In this embodiment, corresponding parts to those in the first embodiment are denoted by like reference numbers and detailed descriptions thereof are omitted.

As shown in FIG. 10A, recording portions 61 of the optical information recording medium 60 of this embodiment is configured such that the cylindrical recording portions 51 arranged side by side in the sixth embodiment are shortened and set upright so that their central axis passing through top and bottom surfaces is perpendicular to the supporting plates. The recording portions 61 are adapted to rotate around their central axis perpendicular to the supporting plates 2 and 3.

The recording portion 61 is allowed to rotate only in the direction of the plane of the supporting plates 2 and 3. As shown in FIG. 10B, to rotate the recording portions 61, electrodes 62a and 62b of opposite polarities of + and − are arranged on each of the supporting plates 2 and 3. In this case, they are arranged so that two electrodes of the same polarity are arranged in opposite positions on the supporting plates as shown. In the case of this embodiment, the recording portion 61 is rotated in such a way that, when negatively charged, it is attracted to the electrodes of positive polarity on the supporting plates 2 and 3.

The recording portion 61 of the optical information recording medium 60 of this embodiment provides a larger recording capacity than the recording portion 5 in the first embodiment. However, while being smaller in recording capacity than the recording portion 51 of the sixth embodiment, it can provide faster recording and reproduction because of quick rotation.

Although the preferred embodiments of the invention have been described, the invention is not limited thereto and can be carried out in various modified forms without departing from its scope. For example, although the embodiments have been described as using laser light to record or reproduce a hologram, it is also possible to use natural light such as sun light or illumination light from an illumination device such as an LED.

According to the invention, an optical information recording medium can be provided which comprises recording portions each formed in the shape of a sphere or cylinder using a recording material capable of recording information in the form of a hologram using light, a inner layer in which the recording portions are rotatably arranged, and a pair of supporting plates which sandwich the inner layer, at least one of the supporting plates being transparent to the light.

In addition, an optical information recording medium can be provided which comprises a number of recording portions each formed in the shape of a sphere or cylinder using a recording material capable of recording information in the form of a hologram using light, having regions which are color-coded with at least two colors, and having its surface region positively or negatively charged, a inner layer in which the recording portions are rotatably arranged, and a pair of supporting plates which sandwich the inner layer and are formed with electrodes to produce an electric field within the inner layer, at least one of the pair of supporting plates being transparent to visible light.

What is claimed is:

1. An optical information recording medium comprising:
recording portions each formed in the shape of a sphere or cylinder using a recording material capable of recording an information in the form of a hologram using light;
a inner layer in which the recording portions are rotatably arranged; and
a pair of supporting plates which sandwich the inner layer, at least one of the supporting plates having a optical transmittivity to a wavelength of the light.

2. The medium according to claim 1, wherein
one of the pair of supporting plates have the optical transmittivity, and the other supporting plate has a reflective layer which reflects light passed through the one supporting plate and bearing the information to the one supporting plate.

3. The medium according to claim 1, further comprising electrodes formed on the pair of supporting plates to produce an electric field within the inner layer.

4. The medium according to claim 2, further comprising electrodes formed on the pair of supporting plates to produce an electric field within the inner layer.

5. The medium according to claim 1, wherein each of the recording portions has its surface region positively or negatively charged.

6. The medium according to claim 1, wherein the each recording portion has its recording material included by an outer wall formed of a transparent material.

7. The medium according to claim 6, wherein each of the recording portions or its outer wall has its surface region positively or negatively charged.

8. An optical information recording medium comprising:
a number of recording portions each formed in the shape of a sphere or cylinder using a recording material capable of recording an information in the form of a hologram using light, having surface regions which are color-coded with at least two colors, and having its surface region positively or negatively charged;
a inner layer in which the recording portions are rotatably arranged; and
a pair of supporting plates which sandwich the inner layer and are formed with electrodes to produce an electric field within the inner layer, at least one of the pair of supporting plates having a optical transmittivity to visible light.

9. Electronic equipment comprising:
an optical information recording medium including
recording portions each formed in the shape of a sphere or cylinder using a recording material capable of recording an information in the form of a hologram using light and having being charged,
a inner layer in which the recording portions are rotatably arranged, and
a pair of supporting plates which sandwich the inner layer and are formed with electrodes to produce an electric field within the inner layer, at least one of the plates having a optical transmittivity to the light;
a light source which emits the light;
an optical section which conducts the light emitted from the light source to the recording portions;

a spatial light modulator which is set in the optical section and modulates the light with information to produce information light;

a voltage driver which applies a voltage to the electrodes to produce an electric field within the inner layer to thereby rotate the recording portions;

an image capture device which captures reproduced light resulting from the recording portions being irradiated with the light; and an image processor which takes the information from reproduced light captured by the image capture device.

10. The equipment according to claim 9, further comprising an angle adjust mirror which is set to reproduce the reproduced light and directs the light onto the recording portions.

* * * * *